(12) United States Patent
Li et al.

(10) Patent No.: US 11,194,561 B1
(45) Date of Patent: Dec. 7, 2021

(54) SYSTEM AND METHOD FOR GENERATING AND RECOMMENDING DESIRED STATE OF VIRTUALIZATION SOFTWARE

(71) Applicant: VMware, Inc., Palo Alto, CA (US)

(72) Inventors: Hui Li, Fremont, CA (US); Mukund Gunti, Sunnyvale, CA (US); Luong Duy Duong, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/923,820

(22) Filed: Jul. 8, 2020

(51) Int. Cl.
*G06F 8/61* (2018.01)
*G06F 9/455* (2018.01)

(52) U.S. Cl.
CPC ............... *G06F 8/63* (2013.01); *G06F 9/455* (2013.01)

(58) Field of Classification Search
CPC .................................. G06F 8/63; G06F 9/455
See application file for complete search history.

(56) References Cited

U.S. PATENT DOCUMENTS

| | | | | |
|---|---|---|---|---|
| 7,343,560 B1 * | 3/2008 | Tanner | ...................... | G06F 8/63 709/220 |
| 8,856,723 B2 * | 10/2014 | Lam | .................... | H04L 41/0873 717/100 |
| 9,047,160 B2 * | 6/2015 | Adi | ........................ | G06F 8/63 |
| 10,002,247 B2 * | 6/2018 | Suarez | ................. | G06F 9/45558 |
| 2002/0108033 A1 * | 8/2002 | Kroening | ................. | G06F 8/658 713/1 |
| 2005/0022176 A1 * | 1/2005 | Ramachandran | ......... | G06F 8/65 717/170 |
| 2006/0075284 A1 * | 4/2006 | Skan | ................... | G06F 11/1433 714/5.1 |
| 2011/0161952 A1 * | 6/2011 | Poddar | ................. | G06F 16/583 717/173 |
| 2012/0233604 A1 * | 9/2012 | Jibbe | ...................... | G06F 8/654 717/168 |
| 2013/0138783 A1 * | 5/2013 | Mallur | ..................... | G06F 8/65 709/221 |
| 2013/0262651 A1 * | 10/2013 | Shah | ...................... | G06F 8/658 709/224 |
| 2018/0024850 A1 * | 1/2018 | Caro Estevez | ......... | G06F 16/51 718/1 |
| 2019/0310872 A1 * | 10/2019 | Griffin | .................. | G06F 9/4411 |
| 2019/0349204 A1 * | 11/2019 | Enke | ..................... | H04L 9/3247 |
| 2020/0027210 A1 * | 1/2020 | Haemel | ................ | G06F 9/5005 |

(Continued)

OTHER PUBLICATIONS

Radchenko et al., "Comparative Analysis of Virtualization Methods in Big Data Processing", 2019, SuperFri.org (Year: 2019).*

(Continued)

*Primary Examiner* — Wei Y Zhen
*Assistant Examiner* — Junchun Wu
(74) *Attorney, Agent, or Firm* — Kim & Stewart LLP (57) ABSTRACT

A recommendation engine evaluates different combinations of available versions of different software images that make up a virtualization software to be installed in a host computer, and recommends one or more of the valid combinations for installation or upgrade. Upon acceptance of the recommended image, a software specification that expresses the desired state of the virtualization software is updated to include versions of the different software images that are in the recommended valid combination.

20 Claims, 8 Drawing Sheets

(56) References Cited

U.S. PATENT DOCUMENTS

2020/0364039 A1* 11/2020 Gibbs ................. G06F 9/45558
2020/0387365 A1* 12/2020 Arif .................... G06F 9/44589

OTHER PUBLICATIONS

Ku et al., "Method for Distribution, Execution and Management of the Customized Application based on Software Virtualization", Feb. 2010, ICACT (Year: 2010).*

Chen et al., "The novel cloud application technology with virtual platform", 2018, MATEC Web of Conferences (Year: 2018).*

Zhang et al., "Towards Virtual Machine Image Management for Persistent Memory", 2019, IEEE (Year: 2019).*

* cited by examiner

SYSTEM AND METHOD FOR GENERATING AND RECOMMENDING DESIRED STATE OF VIRTUALIZATION SOFTWARE

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers and agents from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone for several reasons. First, although different software developers create new versions or updates to the SIBs, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the inter-dependencies and the integration of the newly developed SIBs with other SIBs, it is difficult to make piecemeal changes to the virtualization software for easy consumption by an end user during the lifecycle of the virtualization software.

Furthermore, new releases come in many different forms. A complete release, e.g., a GA (general availability) release, may be made with an ISO image or a bulletin. The bulletin may be employed for partial releases as well, including rollup, patch, update, and extension. Very few end users understand the differences among these different types of partial releases and there are no clear rules that establish when and how a bulletin should be created for a particular type of release.

Consequently, over time, changes to the virtualization software are layered on top of each other and the final image of the virtualization software is not easily captured or described. Worse, history becomes a factor in that past bulletins may have included other SIBs, not overridden in later bulletins. For these reasons, the overall content is difficult to capture or describe, and the end user is unable to answer the question, "What is the current state of the virtualization software configured in each of the hosts in the cluster?" As such, if there is a particular desired state of the virtualization software that the end user is interested in, the end user will have no way of knowing whether the current state is compliant with the desired state and, if not, how to make the current state compliant with the desired state.

For these reasons, a desired state model for managing the lifecycle of virtualization software has been developed. In this model, different software images that make up the virtualization software are selected during installation or upgrade of the virtualization software and an image manager composites the desired image of the virtualization software based on the selections. The selection of the different software images is, however, complex because each software image will have many different versions, and not all combinations of the different versions of the software images are valid.

SUMMARY

One or more embodiments provide a recommendation engine that evaluates different combinations of available versions of different software images that make up the virtualization software, and recommends one or more of the valid combinations for installation or upgrade. Upon acceptance of the recommended image, a software specification that expresses the desired state of the virtualization software is updated to include versions of the different software images that are in the recommended valid combination.

In one embodiment, a method of generating a desired state of virtualization software to be installed in a host computer, wherein the virtualization software includes at least a base image and an add-on image, includes the steps of: determining versions of the base image that are compatible with a hardware platform of the host computer; for each compatible version of the base image, determining versions of the add-on image that are compatible with the base image and the hardware platform of the host computer; presenting as a recommended image a complete image of the virtualization software that contains a first version of the base image that is compatible with the hardware platform and a first version of the add-on image that is compatible with the first version of the base image and the hardware platform of the host computer; and upon acceptance of the recommended image, updating a software specification that expresses the desired state of the virtualization software, to include the first version of the base image and the first version of the add-on image.

Further embodiments include a non-transitory computer-readable storage medium comprising instructions that cause a computer system to carry out the above method, as well as a computer system configured to carry out the above method.

DETAILED DESCRIPTION

According to embodiments, SIBs, more generally referred to herein as payloads, are logically grouped into "components." In the embodiments, a component is a unit of shipment and installation, and a successful installation of a component will appear to the end user as enabling some specific feature. For example, if a software vendor wants to ship a user-visible feature that requires a plug-in, a driver, and a solution, the software vendor will create separate payloads for each of the plug-in, the driver, and the solution, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image includes a core kernel component and components for basic drivers and in-box drivers. The core kernel component is made up of a kernel payload and other payloads that have inter-dependencies with the kernel payload. The collection of components that make up the base image is packaged and released as one unit.

An "add-on" or "add-on image" is a collection of components that the OEM wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

Figure 1:
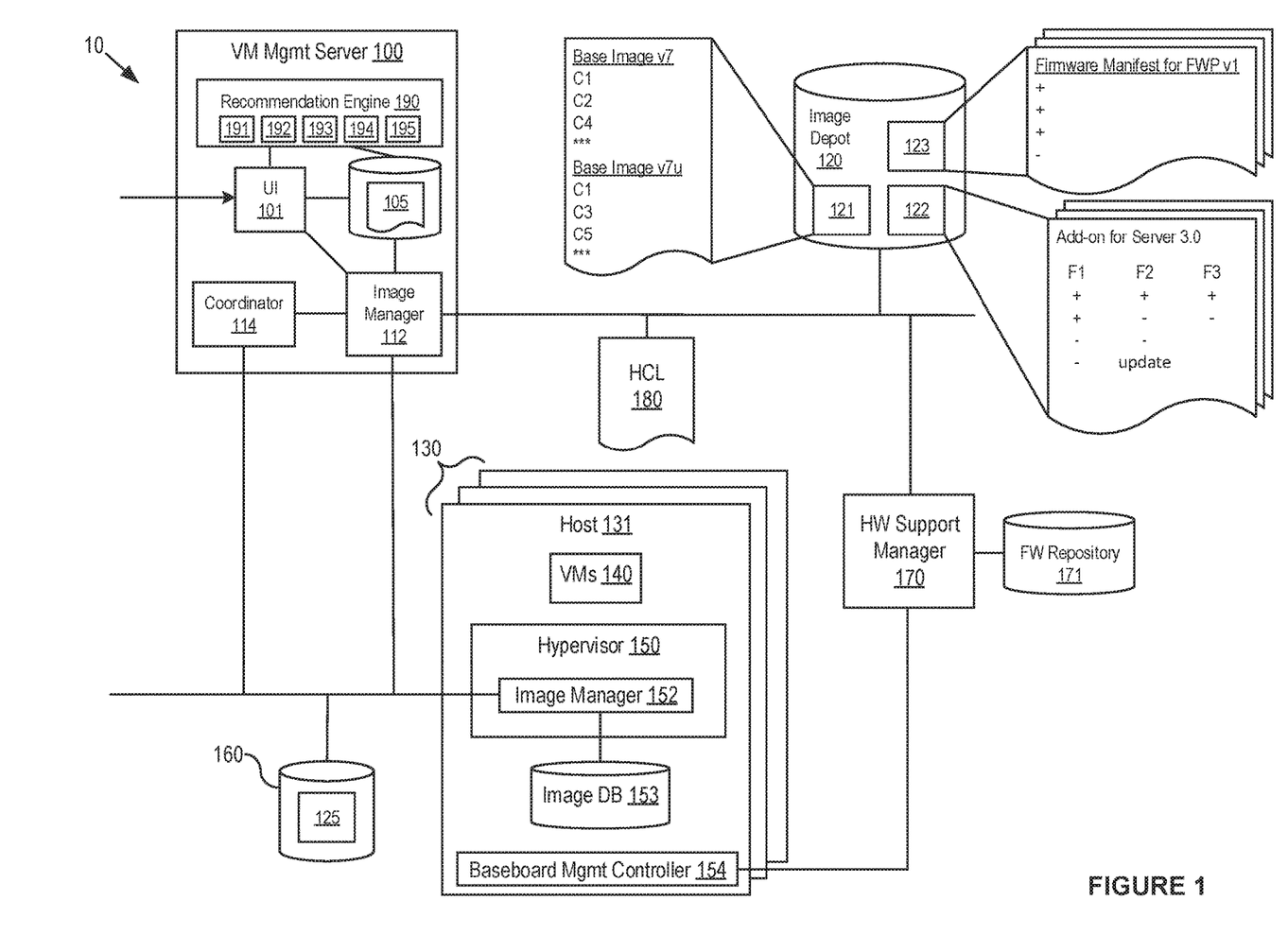
FIG. 1 is a block diagram of a virtualized computing system that implements a desired state model for managing the lifecycle of virtualization software and includes a recommendation engine according to embodiments.

FIG. 1 is a block diagram of a virtualized computing system 10 that implements a desired state model for managing the lifecycle of virtualization software and includes a recommendation engine according to embodiments. Virtualized computing system 10 includes a virtual machine (VM) management server 100, a cluster 130 of hosts 131, an image depot 120, a hardware support manager 170 and firmware repository 171, a shared storage 160, and a hardware compatibility list (HCL) 180. The number of hosts 131 in the cluster may be one or many. By way of example, three hosts 131 are depicted in FIG. 1. Each of hosts 131 may be constructed on a server-grade hardware platform such as an x86 architecture platform. The hardware platform includes one or more central processing units (CPUs), system memory, e.g., random access memory (RAM), and one or more network interface controllers (NICs). A virtualization software layer, also referred to herein as a hypervisor 150, is installed on top of the hardware platform. Hypervisor 150 supports a virtual machine execution space within which multiple VMs 140 may be concurrently instantiated and executed.

In the embodiment illustrated in FIG. 1, hosts 131 access shared storage 160 through their NICs. In another embodiment, each host 131 contains a host bus adapter (HBA) through which input/output operations (IOs) are sent to shared storage 160. Shared storage 160 may comprise, e.g., magnetic disks or flash memory in a storage area network (SAN). In some embodiments, hosts 131 also contain local storage devices (e.g., hard disk drives or solid-state drives), which may be aggregated and provisioned as a virtual SAN device.

VM management server 100 is a physical or virtual server that communicates with hypervisor 150 of each host 131 to provision VMs 140 from the hardware resources of host 131. VM management server 100 logically groups hosts 131 into a cluster 130 to provide cluster-level functions, such as load balancing across cluster 130 by performing VM migration between hosts 131, distributed power management, dynamic VM placement according to affinity and anti-affinity rules, high-availability, and the like.

Through a UI 101 of VM management server 100, an end user expresses a desired state of the virtualization software (i.e., hypervisor 150) for the cluster of hosts 131. One example form for expressing the desired state of the virtualization software is a software specification 105. In software specification 105, the end user designates a particular version of each of base image, add-on, one or more user components, and firmware package.

Metadata and payloads of components, and metadata of base images, add-ons, firmware packages (in the form of a firmware manifest 123) and user components are placed in a data structure referred to as image depot 120. As depicted in FIG. 1, metadata 121 for base images include metadata for "Base Image v7," which include components, C1, C2, C4, etc. and metadata for "Base Image v7u," which include components, C1, C3, C5, etc. FIG. 1 also depicts metadata 122 for add-ons for a family of servers, F1, F2, and F3, where the "+" symbols represent components being added to the base image and the "−" symbols represent components being deleted from the base image, while "update" represents a component in the base image that is being updated. As shown in metadata 122, for each family of servers, there can be different components that are added to, deleted from, and/or updated in the base image. Thus, different add-ons can have different dependencies.

Firmware manifest 123 specifies components that are to be added on top of the base image and the add-on (depicted with a + symbol in FIG. 1) and components that are to be removed from the base image and the add-on (depicted with a − symbol in FIG. 1), so that drivers and agents corresponding to the selected firmware package become part of the image of the virtualization software. In alternative embodiments, separate depots, e.g., in the form of file servers, are set up by OEMs to store metadata and payloads of components that the OEMs publish.

Figure 3:
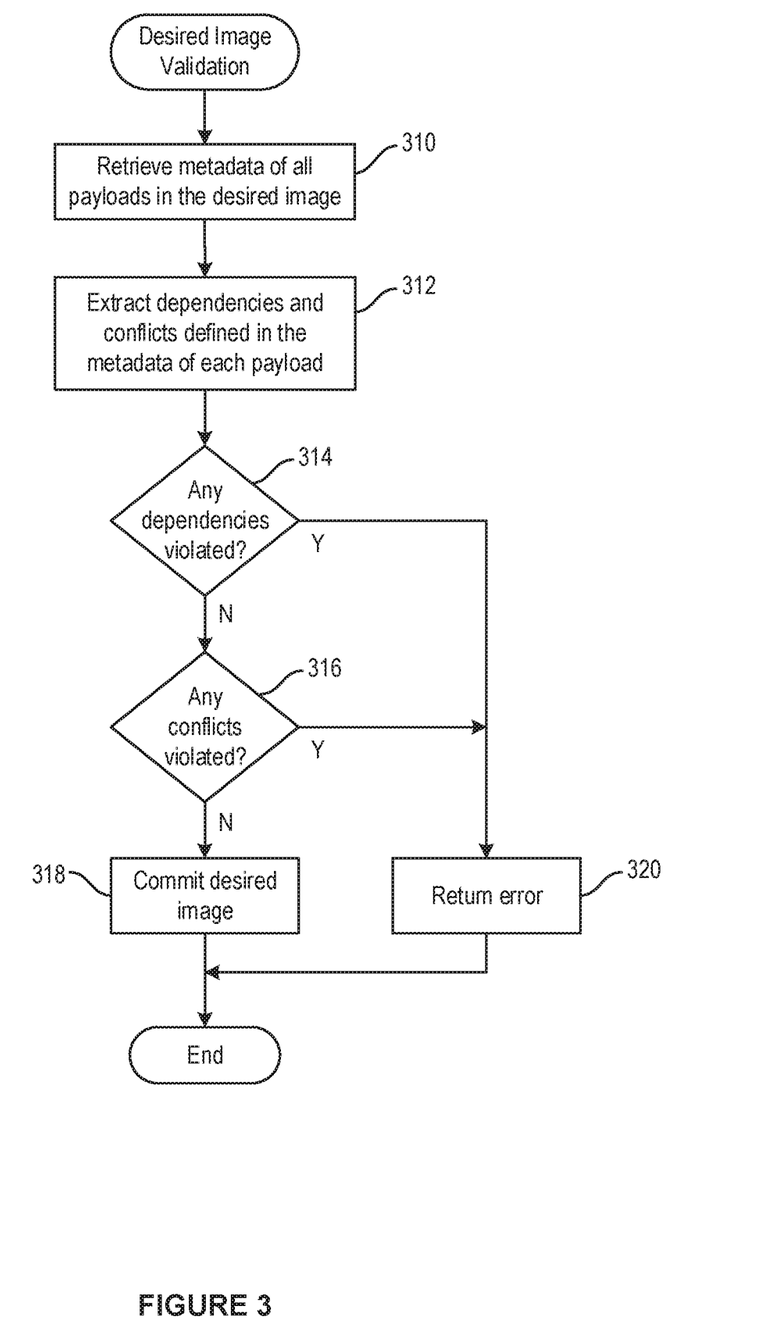
FIG. 3 is a flow diagram of steps carried out to perform validation of the desired image.

After image manager 112 composites the image of the virtualization software, image manager 112 validates the composited image in accordance with the method depicted in FIG. 3 and, if validated, stores the composited image in shared storage 160 as a desired image 125 that is to be installed in each host 131, and hands off control to coordinator 114. Coordinator 114 communicates with image manager 152 of each of hosts 131 through an API call to install desired image 125 in each of hosts 131. Once image manager 152 installs desired image 125, it stores the metadata of the installed image of the virtualization software in image database 153. Going forward, image database 153 of each host 131 operates as the single source of truth for the image of the virtualization software configured in that host, and will record any changes to the state of the virtualization software in image database 153.

Coordinator 114 also communicates with a hardware support manager 170 through an API call to install the firmware in hosts 131. In response to the API call, hardware support manager 170 retrieves the firmware from firmware repository 171 and stages the firmware in hosts 131. Then, the firmware staged in each host 131 is installed in the host by a corresponding baseboard management controller 154.

Hardware support manager 170 is a firmware management software running in a physical or a virtual server that exposes various APIs. The APIs include: (1) an "apply/remediate" API call to install in hosts 131 the firmware specified by the firmware manifest in desired image 125 or to remediate the firmware currently installed in hosts 131 to bring the firmware into compliance, (2) a "list" API to list all of the firmware packages that hardware support manager 170 is supporting, (3) a "scan" API to compare the current state of the firmware running in hosts 131 with the firmware specified by the firmware manifest in desired image 125, (4) a "firmware inventory" API to report a current state of the firmware running in hosts 131, (5) a "pre-check" API to confirm that it is possible to upgrade the firmware currently installed in hosts 131 to the firmware specified by the firmware manifest in desired image 125, and (6) a "stage" API to retrieve the firmware specified by the firmware manifest in desired image 125 and store them in a cache memory of hosts 131 for immediate installation upon receiving an apply or remediate API call. With these APIs, the end user is able to manage the image of the virtualization software installed in hosts 131 and the firmware installed in hosts 131 from a single "pane of glass," in this case, through UI 101 of VM management server 100.

Before desired image 125 is actually installed in hosts 131, image manager 112 performs a validation against a hardware compatibility list (HCL) 180. The goal of this validation, more specifically referred to herein as an HCL validation, is to make sure that desired image 125 which is going to be deployed in hosts 131 is compatible with the hardware devices in hosts 131. HCL 180 contains a list of all hardware devices installed in hosts 131, and identifies for each such hardware device all versions of device firmware and drivers that are compatible therewith. Validation is successful if the versions of the firmware and drivers in desired image 125 are listed in HCL 180 as compatible versions.

Prior to installing desired image 125, or after in the case of upgrades, recommendation engine 190 examines software specification 105 and evaluates other combinations of base images, add-ons, user components, and firmware packages for possible recommendation. In the embodiments described herein, recommendation engine 190 includes a base image filter 191, an add-on filter 192, a user component filter 193, a firmware filter 194, and a complete image filter 195. Base image filter 191 determines which base images available in image depot 120 are compatible with the hardware platform of hosts 131. Add-on filter 192 determines which add-ons are compatible with the hardware platform of hosts 131 and each base image selected by base image filter 191. User component filter 193 determines which user components are compatible with the hardware platform of hosts 131 and each base image selected by base image filter 191. Firmware filter 194 determines which firmware and components needed to support the firmware are compatible with the hardware platform of hosts 131 and each base image selected by base image filter 191. Complete image filter 195 performs a validation of the complete image including a base image, an add-on, user components, and firmware components. The use of these filters in generating combinations of base images, add-ons, user components, and firmware packages for possible recommendation is described below in conjunction with FIGS. 5, 6A-6D, 7, and 8.

Figure 2:
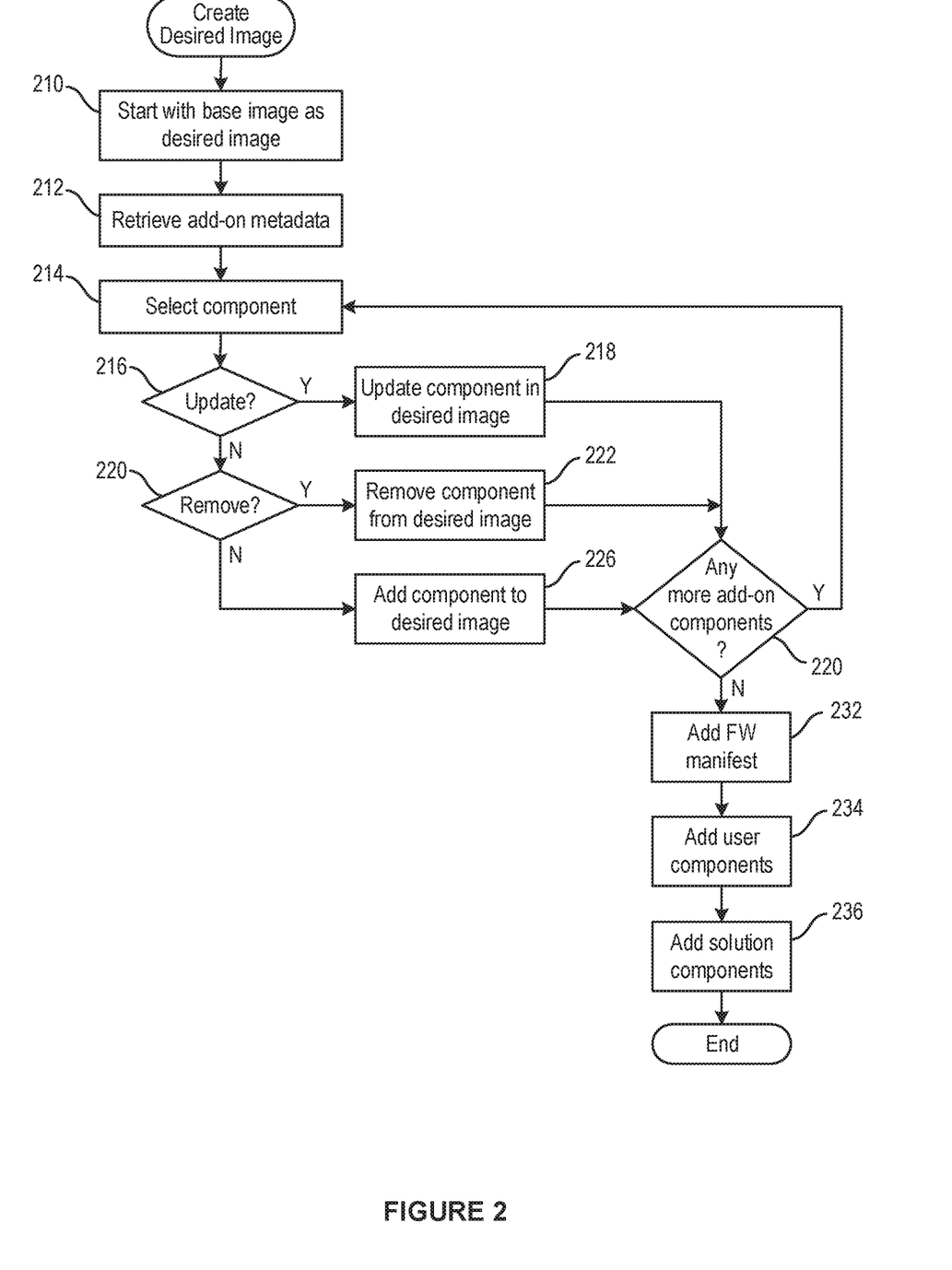
FIG. 2 is a flow diagram of steps carried out to create the desired image of the virtualization software.

FIG. 2 is a flow diagram of steps carried out by image manager 112 to create the desired image of the virtualization software. The method of FIG. 2 begins at step 210, where image manager 112 starts with the metadata of the selected base image as the desired image. Then, at step 212, image manager 112 retrieves the metadata of the selected add-on and parses the metadata of the selected add-on for components.

At step 214, image manager 112 selects an add-on component to process. If the component is to be updated as determined at step 216, image manager 112 updates the metadata of the component in the desired image at step 218. If the component is to be removed as determined at step 220, image manager 112 removes the metadata of the component from the desired image at step 222. If the component is to be neither updated nor removed, it is added to the desired image at step 226. If there are any more add-on components to process, as determined at step 230, the process returns to step 214, where another add-on component is selected for processing.

If there are no more add-on components to process, as determined at step 230, image manager 112 at step 232 processes the firmware manifest corresponding to the selected firmware package to add, update, and remove components in the same manner as the selected add-on was processed. Then, image manager 112 adds to the desired image and one or more user components selected by the user at step 236 and components for a solution selected by the user at step 338. As used herein, "solutions" are features that indirectly impact the desired image when they are enabled by the end user. In other words, the end-user makes selections on UI 101 to enable the solution but does not designate what components to install. The solution's management layer decides the right set of components based on constraints. Examples solutions include HA (high availability), and NSX (network virtualization platform of VMware, Inc.).

FIG. 3 is a flow diagram of steps carried out by image manager 112 to perform validation of the desired image, according to an embodiment. The method of FIG. 3 begins at step 310 at which image manager 112 retrieves metadata of all payloads in the desired image. Then, at step 312, image manager 112 parses the retrieved metadata to extract all dependencies and conflicts defined therein. Image manager 112 executes steps 314 and 316 to determine if any dependencies or conflicts are violated by the payloads that make up the desired image. If there are no such violations, the desired image is committed at step 318 and stored in shared storage 160 as desired image 125. On the other hand, if there is any violation, an error is returned at step 320.

Figure 4:
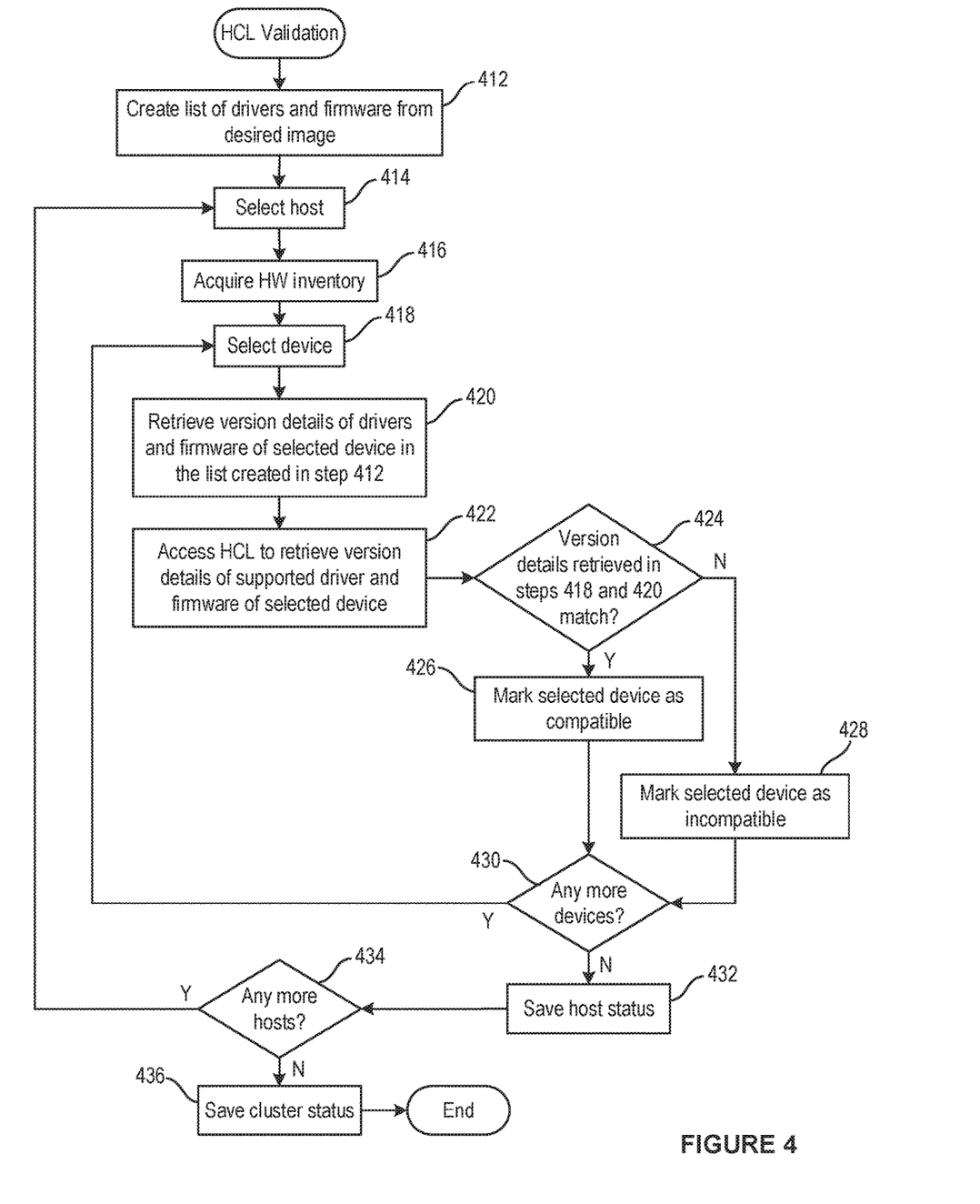
FIG. 4 is a flow diagram of steps carried out to perform validation against a hardware compatibility list.

FIG. 4 is a flow diagram of steps carried out by image manager 112 to perform validation of the desired image of the virtualization software against HCL 180, according to an embodiment. The method of FIG. 4 begins at step 412 at which image manager 112 creates a list of firmware and drivers that are in desired image 125, along with their version numbers. At step 414, image manager 112 selects a host against which HCL validation is performed. Steps 416, 418, 420, 422, 424, 426, 428, 430, 432, and 434 are executed each time a new host is selected at step 414.

At step 416, image manager 112 acquires the hardware inventory of the host, e.g., from a hardware discovery service that is running in VM management server 100. Then, at step 418, image manager 112 selects a unique device in the hardware inventory. Steps 420, 422, 424, 426, 428, and 430 are executed each time a new unique device is selected at step 418. At step 420, image manager 112 retrieves version details of drivers and firmware of the selected device in the list created at step 412. Then, at step 422, image manager 112 accesses HCL 180 to retrieve version details of supported driver and firmware of the selected device. The version details of the drivers and firmware retrieved at step 420 and the version details of the drivers and firmware retrieved at step 422 are then compared at step 424. If there is a match, i.e., the version details of the drivers and firmware retrieved at step 420 can be found in the version details of the drivers and firmware retrieved at step 422, the selected device is marked as compatible at step 426. On the other hand, if there is no match, i.e., the version details of the drivers and firmware retrieved at step 420 cannot be found in the version details of the drivers and firmware retrieved at step 422, the selected device is marked as incompatible at step 428.

If it is determined at step 430 that there is another unique device in the hardware inventory, the process returns to step 418, where image manager 112 selects the next unique device in the hardware inventory. If it is determined at step 430 that there is no other unique device in the hardware inventory, the process proceeds to step 432, at which image manager 112 saves the status for the selected host. If any of the devices were marked as incompatible at step 428, the selected host is marked as incompatible at step 432. If all of the devices were marked as compatible at step 428, the selected host is marked as compatible at step 432.

At step 432, if it is determined that HCL validation has not been carried out for all of hosts 131, the process returns to step 414, where image manager 112 selects the next host for HCL validation. If not, the process proceeds to step 436, at which image manager reads the status of all the hosts in the cluster and saves the status for the entire cluster. If any of the hosts of the cluster were marked as incompatible at step 432, the cluster is marked as incompatible at step 436. If all of the hosts of the cluster were marked as compatible at step 432, the cluster is marked as compatible at step 436. After step 436, the process ends.

Upon selection of a particular combination of base image, add-on, user components, and firmware package, recommendation engine 190 evaluates other combinations to determine if they are valid, and presents one or more valid combinations to the end user. Upon confirmation of a recommendation by the end user or selection of one of the recommendations by the end user, recommendation engine 190 updates software specification 105 with the recommended combination of base image, add-on, user components, and firmware package. Image manager 112 consumes software specification 105 to composite a desired image of the virtualization software.

Figure 5:
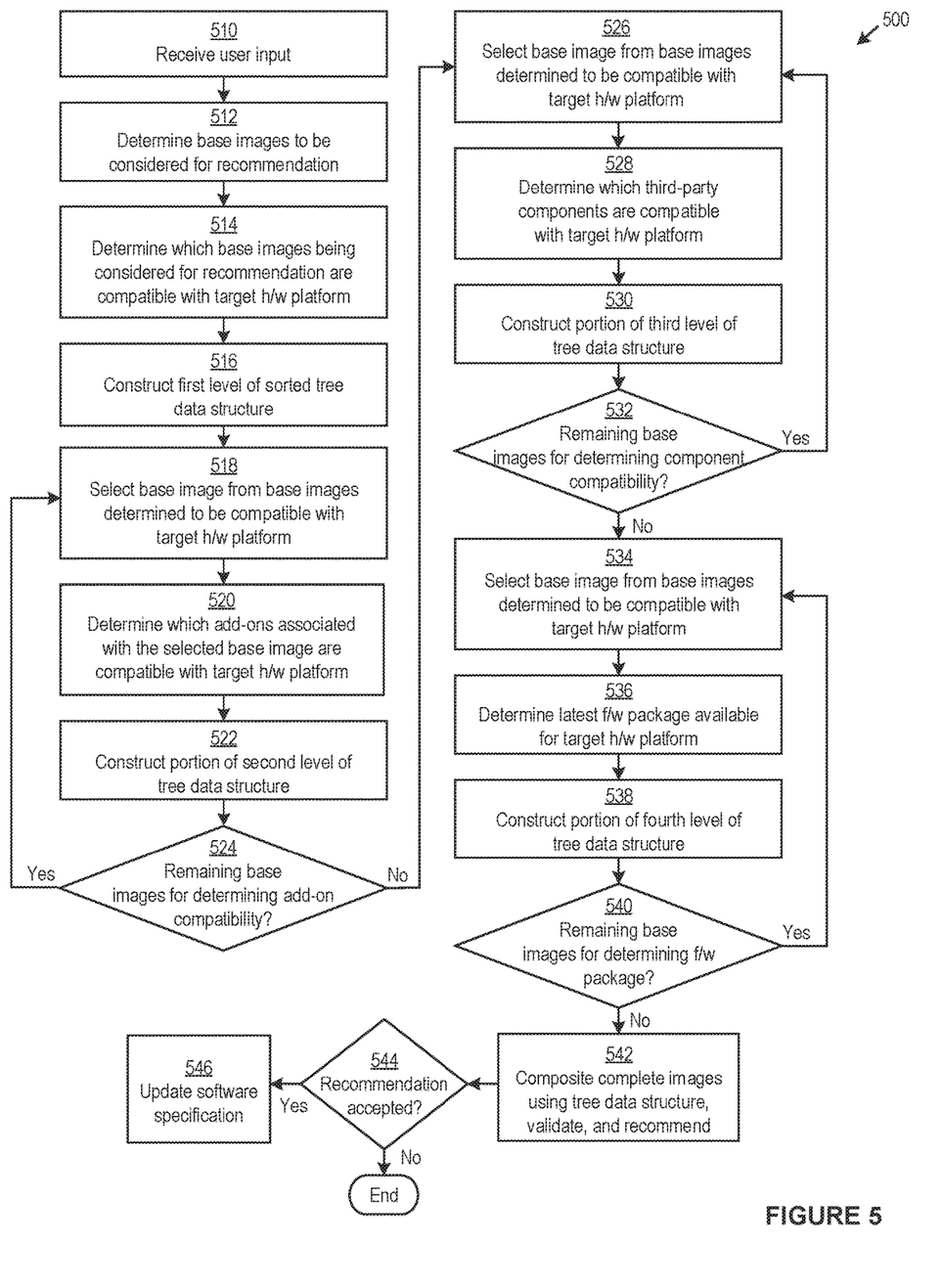
FIG. 5 is a flow diagram of steps carried out by the recommendation engine to generate a tree data structure representing different combinations of software images that will be evaluated for possible recommendation, according to embodiments.

FIG. 5 is a flow diagram of steps carried out by recommendation engine 190 to generate a tree data structure representing different combinations of base image, add-on, user components, and firmware components that will be evaluated for possible recommendation.

Method 500 begins at step 510, where VM management server 100 receives a user input via UI 101 to generate recommendations. At step 512, base image filter 191 of recommendation engine 190 determines which base images stored in image depot 120 are to be considered for recommendation. The base images so determined are limited to versions of the base images that are later than or equal to the version of the base image that is specified in software specification 105. Then, at step 514, base image filter 191 performs an HCL validation of each of the base images against the target hardware platform (which is the hardware platform associated with the add-on specified in software specification 105), and filters out those that are not compatible. The HCL validation of the base image is carried out in the manner described above in conjunction with FIG. 4. The only difference is that the desired image undergoing HCL validation in FIG. 4 is the entire image of the virtualization software and the desired image undergoing HCL validation in step 514 is the base image.

Figure 6A:
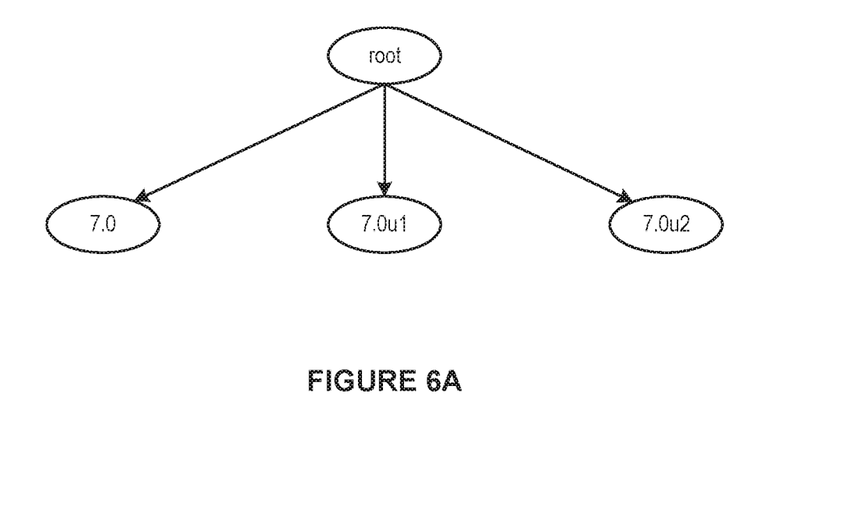
FIGS. 6A-6D schematically illustrates the tree data structure at different stages of construction by the recommendation engine.

At step 516, recommendation engine 190 constructs the first level of the tree data structure. FIG. 6A illustrates one example of a tree data structure that shows compatible base images (shown as 7.0, 7.0u1, and 7.0u2), that remain after the filtering performed at steps 512 and 514. In the embodiments, recommendation engine 190 sorts the tree data structure so that more recent versions of the base images in FIG. 6A appear to the right and the older versions of the base images appear to the left.

At step 518, recommendation engine 190 selects one of the compatible base images. Then, at step 520, add-on filter 192 of recommendation engine 190 determines which add-on or add-ons stored in image depot 120 are compatible with the selected base image and the target hardware platform. Add-on filter 192 determines compatibility with the selected base image by examining the metadata of the add-on, which indicates the versions of the base image that it is compatible with. Add-on filter 192 determines compatibility with the target hardware platform by performing HCL validation of the add-on image against the target hardware platform. The HCL validation of the add-on image is carried out in the manner described above in conjunction with FIG. 4. The only difference is that the desired image undergoing HCL validation in FIG. 4 is the entire image of the virtualization software and the desired image undergoing HCL validation in step 514 is the add-on.

Figure 6B:
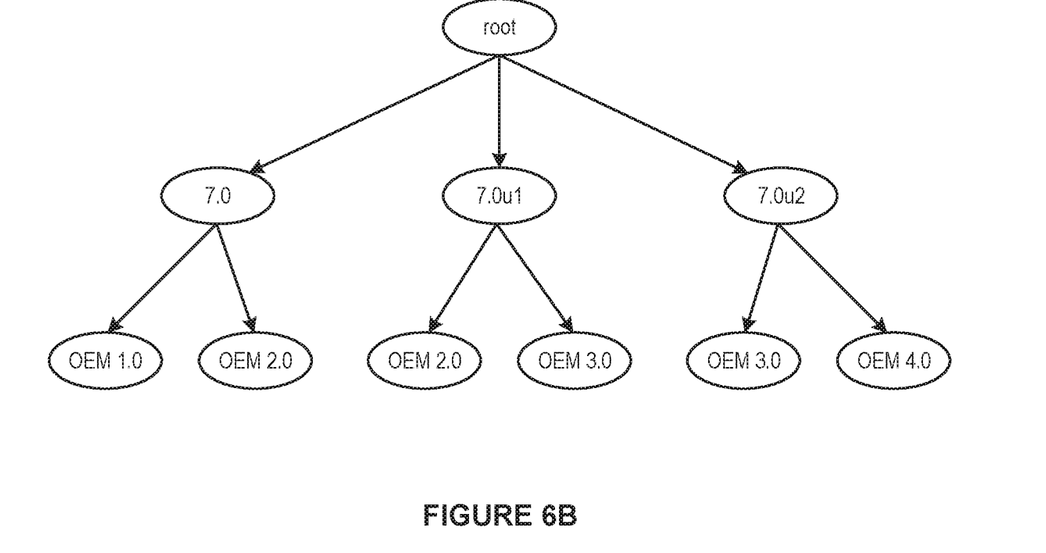

At step 522, recommendation engine 190 constructs a portion of the second level of the tree data structure to show compatible add-on images that remain after the filtering performed at step 520. Then, at step 524, recommendation engine 190 determines whether there are any remaining base images for which the compatibility of add-ons is to be determined. If yes, method 500 returns to step 518; if no, method 500 proceeds to step 526. Accordingly, a second level is added to the tree data structure of FIG. 6A and the resulting tree data structure is shown in FIG. 6B. The add-on versions added to the second level of the tree data structure are shown as OEM 1.0, OEM 2.0, OEM 3.0, and OEM 4.0 in FIG. 6B, and recommendation engine 190 sorts these versions so that more recent versions of the add-ons appear to the right and the older versions of the add-ons appear to the left.

At step 526, recommendation engine 190 selects one of the compatible base images. Then, at step 528, user component filter 193 of recommendation engine 190 determines which versions of the user components specified in software specification 105 and stored in image depot 120 are compatible with the selected base image and the target hardware platform. User component filter 193 determines compatibility with the selected base image by examining the metadata of the user component, which indicates the versions of the base image that it is compatible with. User component filter 193 determines compatibility with the target hardware platform by performing HCL validation of the add-on image against the target hardware platform. The HCL validation of the user component is carried out in the manner described above in conjunction with FIG. 4. The only difference is that the desired image undergoing HCL validation in FIG. 4 is the entire image of the virtualization software and the desired image undergoing HCL validation in step 514 is the user component.

Figure 6C:
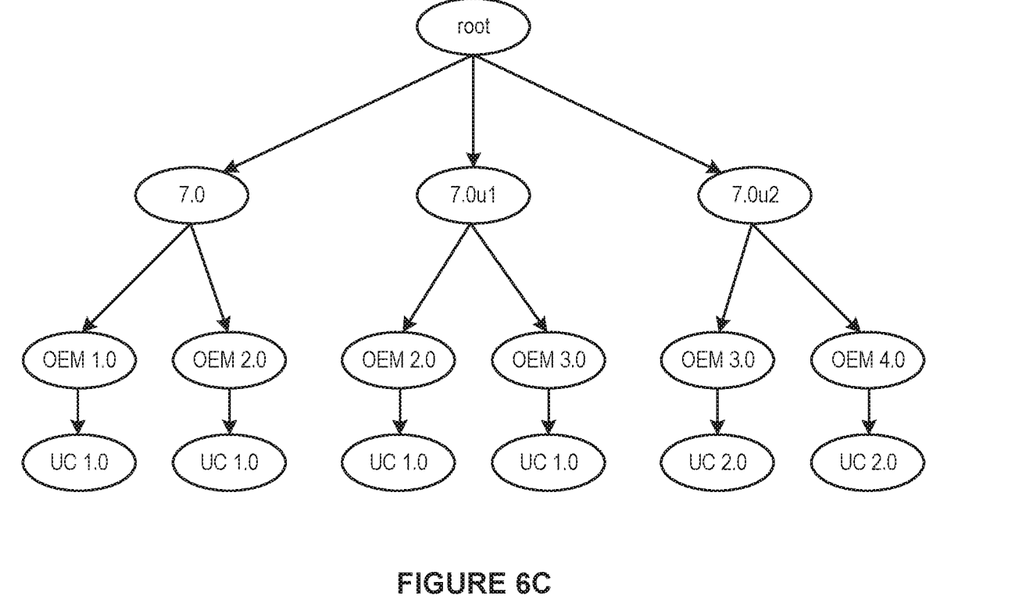

At step 530, recommendation engine 190 constructs a portion of the third level of the tree data structure to show compatible user components that remain after the filtering performed at step 528. Then, at step 532, recommendation engine 190 determines whether there are any remaining base images for which the compatibility of user components is to be determined. If yes, method 500 returns to step 526; if no, method 500 proceeds to step 534. Accordingly, a third level is added to the tree data structure of FIG. 6B and the resulting tree data structure is shown in FIG. 6C. The versions of the user components added to the third level of the tree data structure are shown as UC 1.0 and UC 2.0 in FIG. 6C, and recommendation engine 190 sorts these versions so that more recent versions of the user components appear to the right and the older versions of the user components appear to the left.

At step 534, recommendation engine 190 selects one of the compatible base images. Then, at step 536, firmware filter 194 of recommendation engine 190 determines which versions of the firmware package consisting of firmware and associated components are compatible with the selected base image and the target hardware platform. Firmware filter 194 determines compatibility of each associated component of the firmware with the selected base image by examining the metadata of the associated component, which indicates the versions of the base image that it is compatible with. Firmware filter 194 determines compatibility with the target hardware platform by performing HCL validation of the firmware and associated components against the target hardware platform. The HCL validation of the firmware and associated components is carried out in the manner described above in conjunction with FIG. 4. The only difference is that the desired image undergoing HCL validation in FIG. 4 is the entire image of the virtualization software and the desired image undergoing HCL validation in step 514 is the firmware and associated components.

Figure 6D:
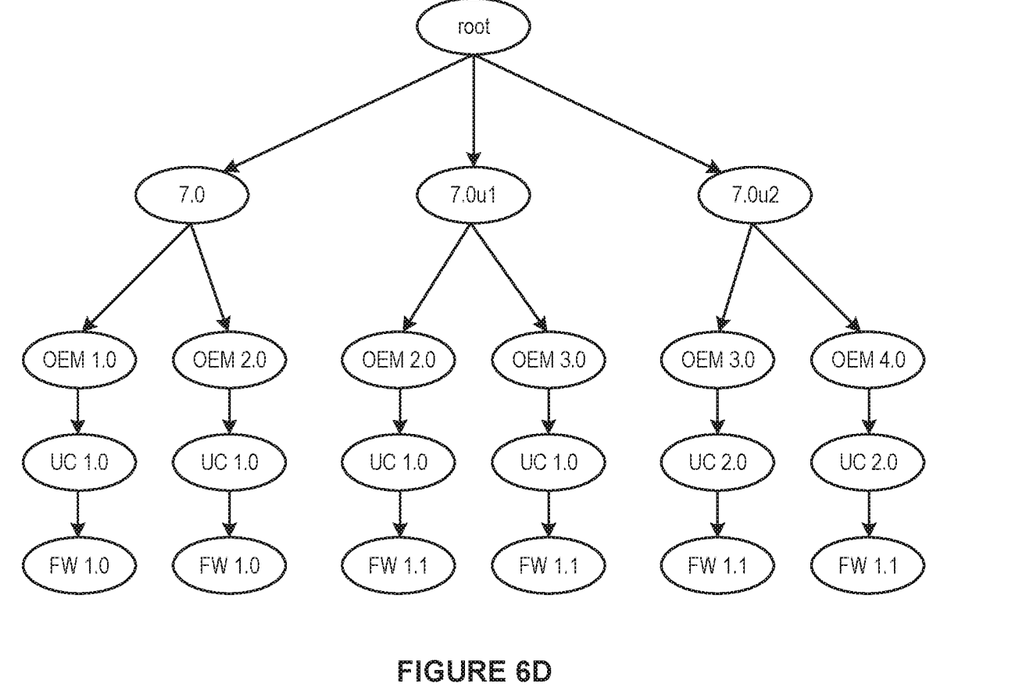

At step 538, recommendation engine 190 constructs a portion of the fourth level of the tree data structure to show the versions of the firmware package that remain after the filtering performed at step 536. These firmware packages are shown as FW 1.0 and FW 1.1 in FIG. 6D. In the embodiments, recommendation engine 190 sorts the tree data structure so that more recent versions of the firmware package in FIG. 6D appear to the right and the older versions of the firmware package appear to the left. Then, at step 540, recommendation engine 190 determines whether there are any remaining base images for which the compatibility of the firmware packages is to be determined. If yes, method 500 returns to step 534; if no, method 500 proceeds to step 542. Accordingly, a fourth level is added to the tree data structure of FIG. 6C and the resulting tree data structure is shown in FIG. 6D. The versions of the firmware package added to the fourth level of the tree data structure are shown as FW 1.0 and FW 1.1 in FIG. 6D, and recommendation engine 190 sorts these versions so that more recent versions of the firmware packages appear to the right and the older versions of the firmware packages appear to the left.

Figure 7:
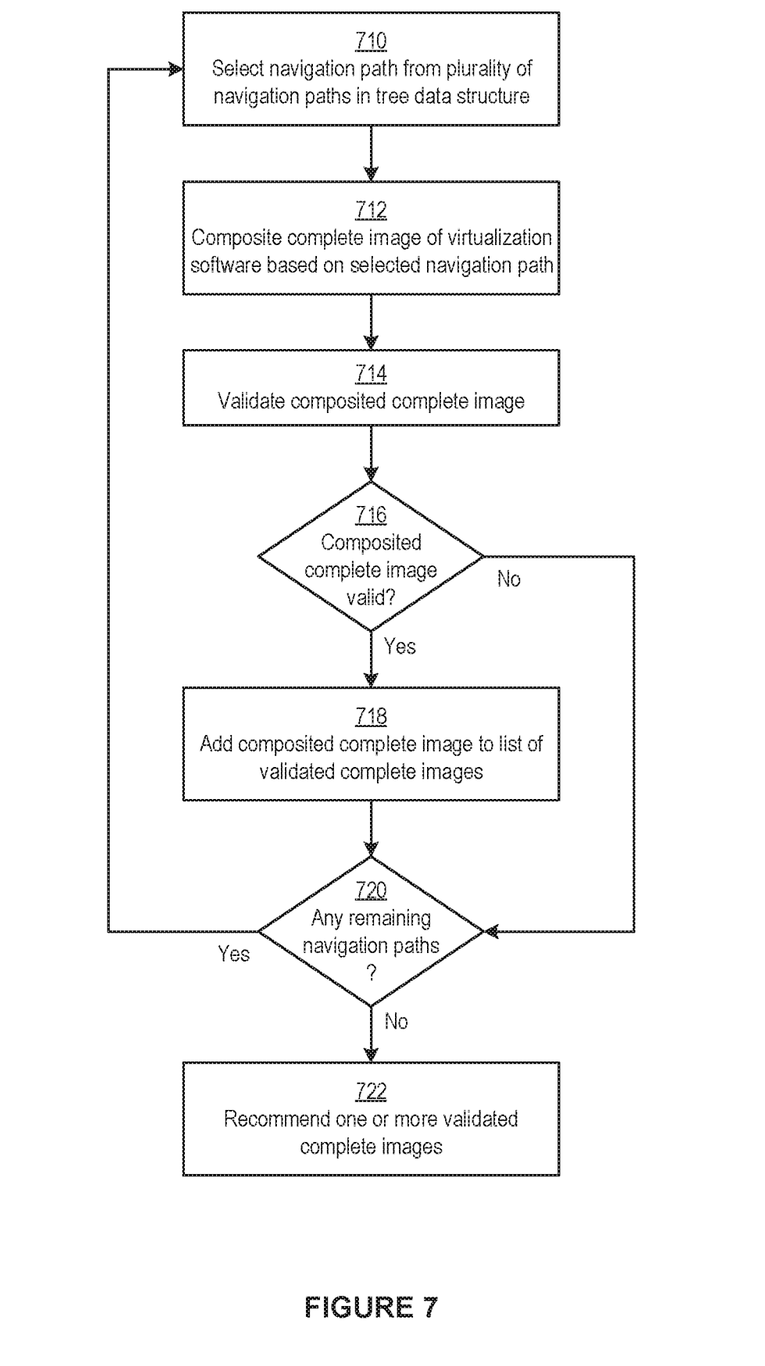
FIG. 7 is a flow diagram of steps carried out by the recommendation engine to evaluate different combinations of software images for recommendation, according to embodiments.

At step 542, complete image filter 195 of recommendation engine 190 examines the tree data structure to composite different complete images of the virtualization software, performs validation of each of the complete images, and selects one or more valid complete images for recommendation. The details of step 542 are shown in FIG. 7.

Complete image filter 195 at step 710 selects a navigation path that traverses through each of the four levels of the tree data structure and at step 712 composites a complete image of the virtualization software based on the nodes that are traversed. Thus, five different complete images can be composited in the tree data structure shown in FIG. 6D. At step 714, the complete image of the virtualization software undergoes validation. Complete image filter 195 performs validation of the complete image by carrying out the validations described above in conjunction with FIGS. 3 and 4.

If the complete image passes validation (step 716, Yes), complete image filter 195 at step 718 adds the complete image to a list of validated complete images, and then proceeds to step 720. If the complete image fails validation (step 716, No), complete image filter 195 skips step 718 and proceeds directly to step 720.

At step 720, complete image filter 195 determines if there are any more navigation paths to be selected. If so, complete image filter 195 proceeds to step 710. If not, complete image filter 195 proceeds to step 722, at which complete image filter 195 recommends one or more of the complete images in the list of validated complete images.

In one embodiment, complete image filter 195 selects the navigation path of the tree data structure starting from the right most navigation path and ending with the left most navigation path. In this manner, a complete image of the virtualization software containing a combination of the latest available software versions is evaluated first and a complete image of the virtualization software containing a combination of the oldest available software versions is evaluated last. If the end user desires to install or upgrade to an image of the virtualization software having the latest available software versions of the base image, add-on, user components, and firmware, a complete image of the virtualization software that is validated first in time is selected for recommendation. Alternatively, if the end user desires to retain the current version of the base image but upgrade to the latest available software versions of the add-on, user components, and firmware, a complete image of the virtualization software containing the current version of the base image that is validated first in time is selected for recommendation. In some embodiments, both recommendations may be presented to the user, prompting the user to select one.

Referring back to FIG. 5, recommendation engine 190 presents one or more recommended complete images to the end user via UI 101. Upon acceptance of the recommended complete image (or selection of one of them) by the end user via UI 101 (step 544, Yes), recommendation engine 190 at step 546 updates software specification 105 to include the versions of the base image, add-on, user components, and firmware package that makes up the recommended complete image. Subsequently, upon detection of an update to software specification 105, image manager 112 composites desired image 125 from software specification 105 and hands off control to coordinator 114 for coordinator 114 to make API calls to install desired image 125 in hosts 131 or upgrade hosts 131 to desired image 125. If the recommended complete image is not accepted by the end user (step 544, No), method 500 ends.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of generating a desired state of virtualization software to be installed in a host computer using metadata of base images and metadata of add-on images stored in an image depot wherein each of the base images includes a first set of components for booting up the host computer with the virtualization software and each of the add-on images includes a second set of components for adding customized features to the virtualization software, said method comprising:

determining from the metadata of base images stored in the image depot, the base images that are compatible with a hardware platform of the host computer;

for each of the compatible base images, determining from the metadata of add-on images, the add-on images that are compatible with the base image and the hardware platform of the host computer;

presenting as a recommended image a complete image of the virtualization software that contains one of the compatible base images and one of the compatible add-on image; and upon acceptance of the recommended image, updating a software specification that expresses the desired state of the virtualization software, to include the compatible base image and the compatible add-on image that are part of the recommended image.

2. The method of claim 1, wherein the compatible base image in the recommended image is the most recent version of the compatible base image.

3. The method of claim 1, wherein the compatible base image in the recommended image is a version of the compatible base images that is currently installed in the host computer.

4. The method of claim 1, wherein the compatible add-on image in the recommended image is the most recent version of the compatible add-on images.

5. The method of claim 1, further comprising:

for each compatible base image, determining a third set of components that are compatible with the compatible base image and the hardware platform of the host computer, wherein the recommended image includes components of the compatible base image in the recommended image, components of the compatible add-on image in the recommended image, and at least two other components that are compatible with the compatible base image in the recommended image and the hardware platform of the host computer.

6. The method of claim 5, wherein the at least two other components include a first component containing a third-party driver and a second component containing drivers and agents associated with firmware installed in the host computer.

7. The method of claim 1, wherein the hardware platform of the host computer is determined from the software specification.

8. A non-transitory computer readable medium comprising instructions that are executable in a computer system, wherein the instructions when executed cause the computer system to carry out a method of generating a desired state of virtualization software to be installed in a host computer using metadata of base images and metadata of add-on images stored in an image depot, wherein each of the base images includes a first set of components for booting up the host computer with the virtualization software and each of the add-on images includes a second set of components for adding customized features to the virtualization software, said method comprising:

determining from the metadata of base images stored in the image depot, the base images that are compatible with a hardware platform of the host computer;

for each of the compatible base images, determining from the metadata of add-on images, the add-on images that are compatible with the base image and the hardware platform of the host computer;

presenting as a recommended image a complete image of the virtualization software that contains one of the compatible base images one of the compatible add-on images; and upon acceptance of the recommended image, updating a software specification that expresses the desired state of the virtualization software, to include the compatible base image and the compatible add-on image that are part of the recommended image.

9. The non-transitory computer readable medium of claim 8, wherein the compatible base image in the recommended image is the most recent version of the compatible base images.

10. The non-transitory computer readable medium of claim 8, wherein the compatible base image in the recommended image is a version of the compatible base images that is currently installed in the host computer.

11. The non-transitory computer readable medium of claim 8, wherein the compatible add-on image in the recommended image is the most recent version of the compatible add-on images.

12. The non-transitory computer readable medium of claim 8, wherein the method further comprises:

for each compatible base image, determining a third set of components that are compatible with the compatible base image and the hardware platform of the host computer, wherein the recommended image includes components of the compatible base image in the recommended image, components of the compatible add-on image in the recommended image, and at least two other components that are compatible with the compatible base image in the recommended image and the hardware platform of the host computer.

13. The non-transitory computer readable medium of claim 12, wherein the at least two other components include a first component containing a third-party driver and a second component containing drivers and agents associated with firmware installed in the host computer.

14. The non-transitory computer readable medium of claim 8, wherein the hardware platform of the host computer is determined from the software specification.

15. A computer system comprising:
a plurality of host computers;
a management server executing instructions to generate a desired state of virtualization software to be installed in the host computers using metadata of base images and metadata of add-on images stored in an image depot, wherein each of the base images includes a first set of components for booting up the host computers with the virtualization software and each of the add-on images includes a second set of components for adding customized features to the virtualization software, and the instructions cause the management server to carry out a method comprising:

determining from the metadata of base images stored in the image depot, the base images that are compatible with a hardware platform of the host computers;

for each of the compatible base image, determining from the metadata of add-on images, the add-on images that are compatible with the base image and the hardware platform of the host computers;

presenting as a recommended image a complete image of the virtualization software that contains one of the compatible base images one of the compatible add-on images; and upon acceptance of the recommended image, updating a software specification that expresses the desired state of the virtualization software, to include the compatible base image and the compatible add-on image that are part of the recommended image.

16. The computer system of claim 15, wherein the compatible base image in the recommended image is the most recent version of the compatible base images.

17. The computer system of claim 15, wherein the compatible base image in the recommended image is a version of the compatible base images that is currently installed in the host computers.

18. The computer system of claim 15, wherein the compatible add-on image in the recommended image is the most recent version of the compatible add-on images.

19. The computer system of claim 15, wherein the method further comprises:

for each compatible base image, determining a third set of components that are compatible with the compatible base image and the hardware platform of the host computers, wherein the recommended image includes components of the compatible base image in the recommended image, components of the compatible add-on image in the recommended image, and at least two other components that are compatible with the compatible base image in the recommended image and the hardware platform of the host computers.

20. The computer system of claim 19, wherein the at least two other components include a first component containing a third-party driver and a second component containing drivers and agents associated with firmware installed in the host computers.

* * * * *